(12) United States Patent
Murty et al.

(10) Patent No.: US 7,422,093 B2
(45) Date of Patent: Sep. 9, 2008

(54) MAGNETO-RHEOLOGICAL COUPLING

(75) Inventors: Balarama V. Murty, West Bloomfield, MI (US); Chandra S. Namuduri, Troy, MI (US); Kenneth J. Shoemaker, Highland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 246 days.

(21) Appl. No.: 11/341,786

(22) Filed: Jan. 27, 2006

(65) Prior Publication Data

US 2006/0254871 A1 Nov. 16, 2006

Related U.S. Application Data

(60) Provisional application No. 60/680,361, filed on May 12, 2005, provisional application No. 60/680,194, filed on May 12, 2005.

(51) Int. Cl.
*F16D 27/00* (2006.01)
(52) U.S. Cl. ..................................... 192/21.5; 192/52.4
(58) Field of Classification Search ................ 192/21.5, 192/52.4
See application file for complete search history.

(56) References Cited

U.S. PATENT DOCUMENTS

| 5,829,547 | A | 11/1998 | Fujii et al. ................... 180/422 |
| 6,290,043 | B1 | 9/2001 | Ginder et al. ............... 192/21.5 |
| 6,318,531 | B1 | 11/2001 | Usoro et al. ................ 192/21.5 |
| 6,920,753 | B2 | 7/2005 | Namuduri ..................... 60/435 |
| 7,240,485 | B2 * | 7/2007 | Namuduri et al. .............. 60/326 |
| 7,257,947 | B2 * | 8/2007 | Namuduri ..................... 60/435 |
| 7,296,543 | B2 * | 11/2007 | Namuduri et al. ......... 123/41.44 |
| 2005/0107198 | A1 | 5/2005 | Sowul et al. |

* cited by examiner

*Primary Examiner*—Ha D. Ho

(57) ABSTRACT

A magneto-rheological coupling (MRC) having an input assembly and an output member. The output member includes a generally cylindrical drum portion and a hub portion extending radially inwardly therefrom. The generally cylindrical drum portion has a low magnetically permeable region having a plurality of passages defined therein. Additionally, a plurality of apertures are defined by the hub portion. The plurality of passages and apertures enhance the flow of magneto-rheological fluid (MRF) within the MRC. The drum portion has a surface treatment of tungsten-carbide to enhance wear resistance. Additionally, the drum portion has an average roughness, or Ra value, of between 10 and 250 microns.

15 Claims, 2 Drawing Sheets

MAGNETO-RHEOLOGICAL COUPLING

CROSS-REFERENCE TO RELATED APPLICATIONS

This application claims the benefit of U.S. Provisional Application 60/680,194, filed May 12, 2005, and U.S. Provisional Application 60/680,361, filed May 12, 2005, both of which are hereby incorporated by reference in their entirety.

TECHNICAL FIELD

The present invention relates to magneto-rheological couplings.

BACKGROUND OF THE INVENTION

It is known to provide a power steering system for a vehicle, such as a motor vehicle, to assist a driver in steering the motor vehicle. Typically, the power steering system is of a hydraulic type. The hydraulic power steering system employs an engine driven hydraulic power steering pump for generating pressurized fluid, which is subsequently communicated to a hydraulic steering gear of the motor vehicle. Since the power steering pump is driven directly by the engine using a belt or other method, its rotational speed is determined by that of the engine and it operates continuously as long as the engine is running, resulting in continuous circulation of the hydraulic fluid through the steering gear. In addition, the power steering pump must provide the required flow and pressure for the worst case engine speed, which is typically near idle engine speed, under static steering conditions.

More recently, electro-hydraulic power steering systems have been used to provide an on-demand hydraulic pressure using an electric motor to drive the hydraulic power steering pump. An example of such an electro-hydraulic power steering system incorporates a hydraulic power steering pump driven by a brushless direct current electric motor controlled by a pulse width modulated inverter. Also in use are electrically driven steering systems, which are operable to assist in steering the vehicle using purely electro-mechanical system components.

Other devices, such as the one described in commonly assigned U.S. Pat. No. 6,920,753, provide a means to directly control the speed of the power steering pump by using a magneto-rheological clutch or coupling (MRC) disposed between the accessory drive belt and the power steering pump. The MRC provides a continuously variable speed by controlling the torque transmitted to the power steering pump. The MRC can be part of the pump assembly, a separate unit, an integral part of the pump pulley, etc. The viscosity of the magneto-rheological fluid, or MRF, contained within the MRC can be controlled by exposing the MRF to a magnetic field. As the viscosity of the MRF is increased, the torque transfer through the fluid is increased. Since a conventional electronic control unit (ECU) can control the intensity of the magnetic field, the speed of the power steering pump may be varied independent of engine speed.

SUMMARY OF THE INVENTION

Provided is a magneto-rheological coupling having an input assembly coaxially disposed and spaced from an output member such that at least one working gap is defined between the input assembly and the output member. A magneto-rheological fluid is at least partially disposed within the working gap. The magneto-rheological fluid has a variable viscosity characteristic in the presence of a variable magnetic field. Additionally, the output member has a generally cylindrical drum portion having a low magnetic permeability region having a plurality of passages defined therein. These passages allow the magneto-rheological fluid to pass therethrough. Each of the passages may be a circular hole or a circumferentially extending slot.

Furthermore, the output member has a hub portion extending generally radially from the drum portion. The hub portion defines a plurality of apertures extending to the magnetic drum portion, wherein the apertures allow the magneto-rheological fluid to pass therethrough.

The generally cylindrical drum portion is formed from a material, and is adapted to have at least one surface in contact with the magneto-rheological fluid. The surface has a surface treatment thereon such that the surface is harder than the material forming the drum portion thereby reducing wear to the drum portion. The surface treatment may be electro-spark deposition of tungsten-carbide. Additionally, the surface treatment may have an average roughness, or Ra value, of between 10 and 250 microns to increase the shear forces within the working gap.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
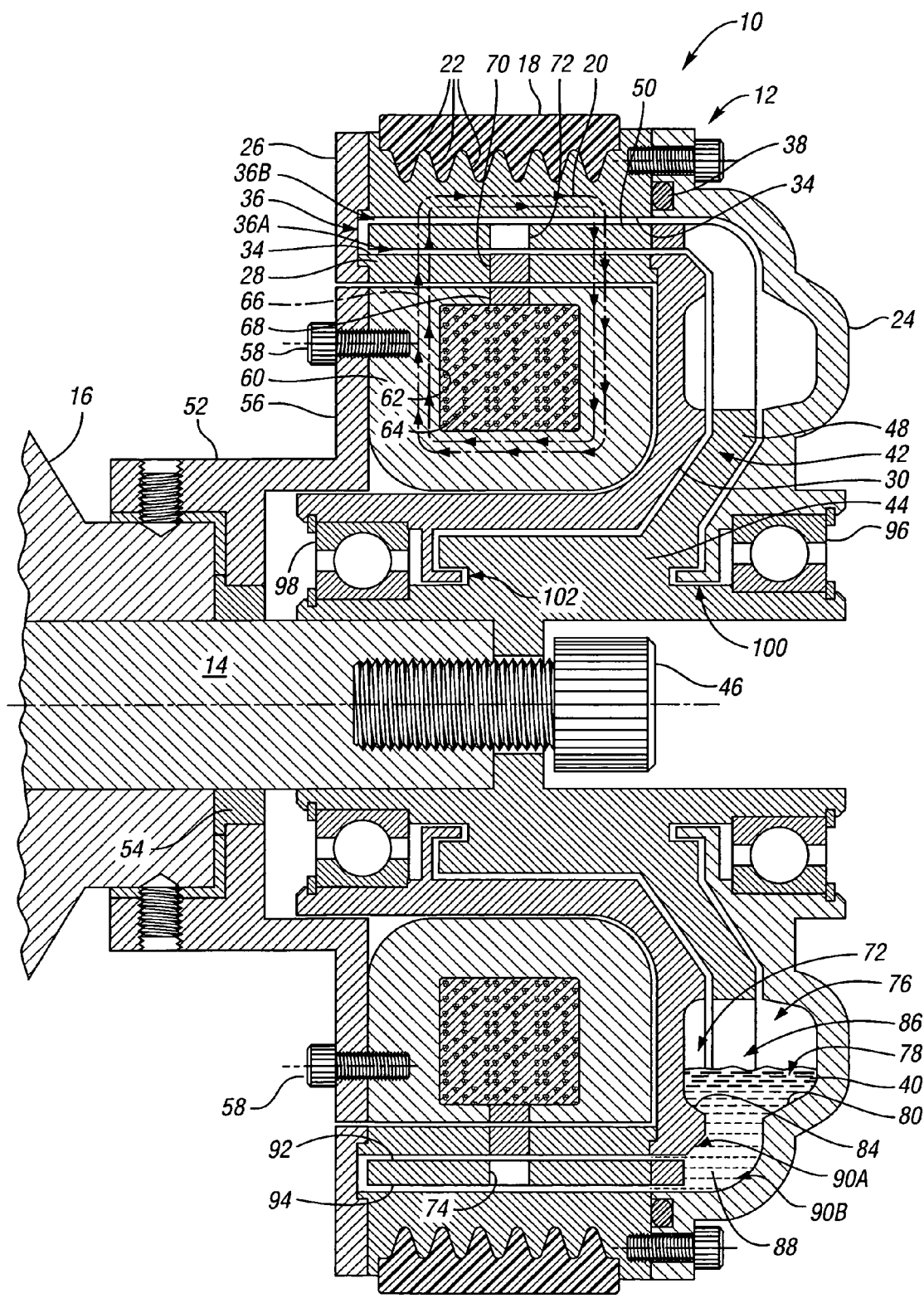
FIG. 1 is a cross sectional elevational view of a magneto-rheological fluid clutch or coupling (MRC) of the present invention, shown at rest and adapted to operate a vehicular power steering pump.

Referring now to the drawings wherein like reference numbers represent similar components throughout the several views, there is seen in FIG. 1 a magneto-rheological fluid coupling (MRC) 10 having an input assembly 12 rotatably mounted with respect to a drive shaft 14 of a hydraulic power steering pump 16 and adapted to be driven by an engine accessory drive belt 18. Those skilled in the art will recognize other methods of providing drive to the MRC 10 that may be employed within the scope of the claimed invention, such as a gear drive. The MRC 10 is adapted to provide variable rotational speed to the drive shaft 14 of the power steering pump 16. The rotational speed of the drive shaft 14 may be varied from a near-zero or minimum rotational speed condition to a maximum of the rotational speed of the input assembly 12. The input assembly 12 includes a generally cylindrical magnetically permeable ring member 20 coaxially located with respect to, and radially spaced from, the drive shaft 14. The magnetically permeable ring 20 has a plurality of grooves 22 defined thereon which are operable to provide a frictional surface upon which the accessory drive belt 18 may engage.

The input assembly 12 also incorporates a non-magnetic first cover 24, a non-magnetic second cover 26, a magnetically permeable ring member 28 and a non-magnetic hub member 30. The first cover 24 and second cover 26 are secured to the magnetically permeable ring member 20. The second cover 26 and hub member 30 are secured to the magnetically permeable ring member 28. The first cover 24, second cover 26, and hub member 30 cooperate to position the magnetically permeable ring member 20 coaxially with respect to the magnetically permeable ring member 28. The magnetically permeable ring member 28 forms a circumferential inner boundary 32 while the magnetically permeable ring member 20 forms a circumferential outer boundary 34 of a working gap 36. A seal 38, such as an elastomeric o-ring, is disposed between the first cover 24 and the magnetically permeable ring member 20 and operates to disallow leakage of magneto-rheological fluid (MRF) 40 from the MRC 10. The MRF 40 contains magnetizable particles such as carbonyl iron spheroids of about half (½) to twenty five (25) microns in diameter dispersed in a viscous fluid such as silicon oil or synthetic hydrocarbon oil. The MRF 40 may also contain surfactants, flow modifiers, lubricants, viscosity enhancers, and other additives.

An inner rotor or output member 42 includes a non-magnetic drive portion 44 secured to the drive shaft 14 through an interference fit or other method. A fastener 46, such as a hex head bolt, is employed to fixedly retain the output member 42 in relation to the drive shaft 14. A non-magnetic hub portion 48 extends generally radially from the drive portion 44, while a magnetically permeable drum portion 50, which is substantially cylindrical in shape, extends generally axially from the hub portion 48. The drum portion 50 bisects the working gap 36, thereby creating a first working gap 36A and a second working gap 36B. The dual working gap geometry of the MRC 10 is suited to reduce the axial length of the MRC 10 thereby minimizing the cantilevered loading on the driveshaft 14.

A bracket 52, with an generally L-shaped cross section, is secured to the power steering pump 16 and is piloted to the drive shaft 14 by a low-friction bushing 54. The bushing 54 may be made from a material such as Polytetrafluoroethylene (PTFE) or similar material. The bracket 52 includes a radially projecting flange 56 operable to cooperate with a plurality of fasteners 58 to secure a magnetically permeable core 60 in a generally concentric relation to each of the drive shaft 14, magnetically permeable ring member 28, the drum portion 50, and the magnetically permeable ring member 20. The core 60 has an annular channel 62 within which a wire coil 64 is disposed. The wire coil 64 is operable to provide a magnetic field 66 when energized with an electrical current. The core 60 has a low magnetic permeability region 68 formed centrally thereon. The region 68 ensures that the magnetic field 66 of the core 60 is distributed properly through the working gap 36. The magnetically permeable ring member 28 has a similar low magnetic permeability region 70 to ensure that the magnetic field 66 is distributed properly through the working gap 36. Additionally, the drum portion 50 includes a low magnetic permeability region 72 operable to ensure that the magnetic field 66 is distributed properly through the working gap 36. The core 60, the magnetically permeable ring member 28, the drum portion 50, the magnetically permeable ring member 20, and MRF 40 disposed within the working gaps 36A and 36B cooperate to form the magnetic circuitry of the MRC 10.

Figure 2A:
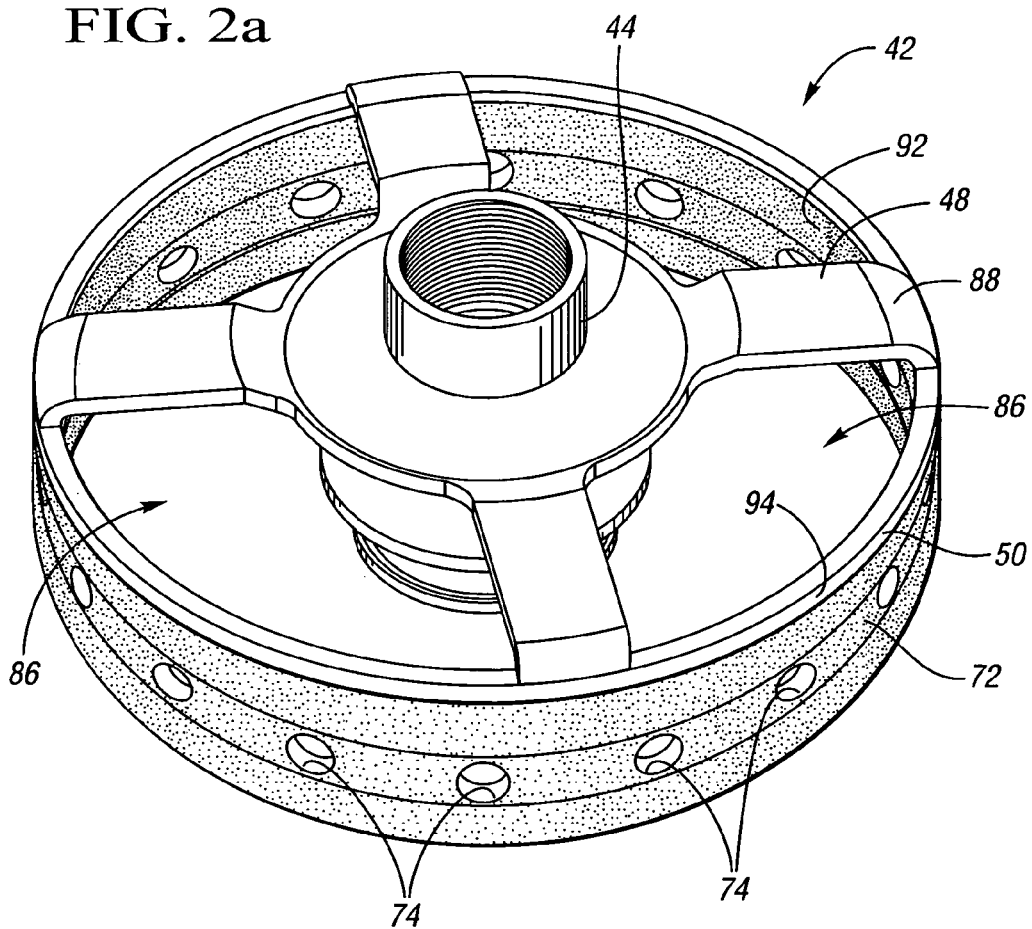
FIG. 2a is a perspective view of a rotor or output member operable to be used within the MRC shown in FIG. 1 illustrating the various aspects of the present invention.
Figure 2B:
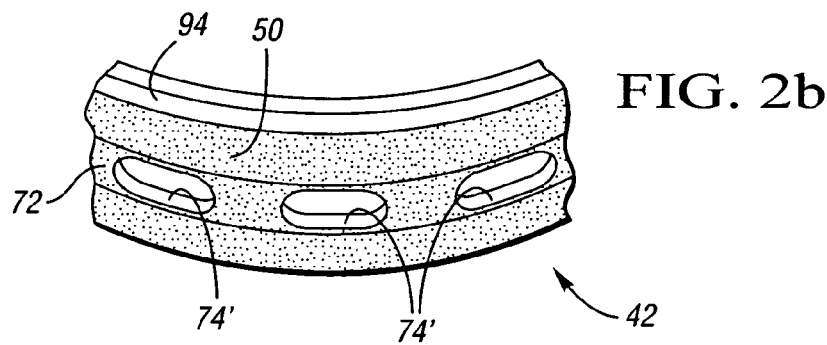
FIG. 2b is a partial perspective view of a portion of the output member shown in FIG. 2a, illustrating a plurality of circumferentially extending slots defined therein.
Figure 2C:
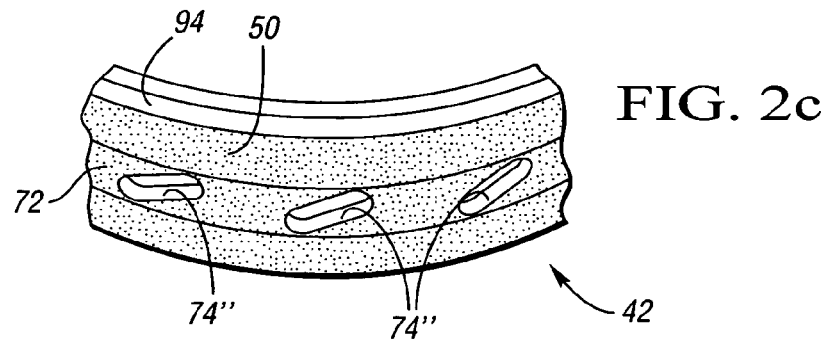
FIG. 2c is a partial perspective view of a portion of the output member shown in FIG. 2a, illustrating a plurality of angled slots defined therein.

The region 72, in the preferred embodiment, contains a plurality of orifices or passages 74 preferably equiangularly spaced and circumferentially disposed about the drum portion 50. The orifices 74 may be circular, as shown in FIG. 2a, or may be of other designs such as circumferentially extending slots (illustrated in FIG. 2b by passages 74'), angled slots (illustrated in FIG. 2c by passages 74"), ovals, v-shapes, squares, rectangles, etc. The passages 74 are effective in distributing the MRF 40 between the first and second working gaps 36A and 36B. Additionally, it has been shown through experimentation that the inclusion of passages 74 within the region 72 will provide an increase in shear force within the MRF 40 during operation of the MRC 10. The inclusion of passages 74 may reduce or eliminate inadvertent or uncommanded lock-up of the MRC 10. At high speeds, the magnetic particles within the MRF 40 tend to accumulate within the working gap 36. If the quantity of accumulated magnetic particles becomes large enough, they may cause the magnetically permeable ring member 20, the magnetically permeable ring member 28, and/or the drum portion 50 to bind causing an uncommanded lock-up condition that will reduce the operating efficiency and control effectiveness of the magneto-rheological system. The passages 74 will allow the accumulated magnetic particles to pass therethrough, allowing the magnetic particles to move to an area of lower concentration within the working gap 36 thereby avoiding the uncommanded lock-up condition of the MRC 10. Those skilled in the art will recognize that the number, size, shape, and spacing of the passages 74 is specific to the application and flow characteristics of the MRF 40 within the MRC 10.

The first cover 24 and the hub portion 48 cooperate to form a storage cavity 76 for MRF 40 that happens to recede from the working gap 36 when the MRC 10 is idle. The first cover 24 has an inner cavity 78 that is a portion of the storage cavity 76. The inner cavity 78 has a generally frusto-conical wall 80 that diverges toward the working gap 36. The hub portion 48 has an inner cavity 82 that is a portion of the storage cavity 76. The inner cavity 82 has a generally frusto-conical wall 84 that diverges toward the working gap 36. Centrifugal forces acting on the MRF 40 in the inner cavities 78 and 82 promote the return of the MRF 40 to the working gap 36 during operation of the MRC 10.

A plurality of openings or apertures 86 are defined by the hub portion 48 and are operable to communicate MRF 40 within the storage cavity 76, i.e. between cavities 78 and 72. The apertures 86 extend radially to the drum portion 50, as shown in FIG. 2a, and thereby minimize the area of radius portion 88. The MRC 10 may experience magnetic particle packing in regions 90A and 90B. In the regions 90A and 90B, the particles within the MRF 40 may accumulate and cause an uncommanded lock-up condition at high speeds. By providing apertures 86 that extend to the drum portion 50, the particles may move freely between the first and second working gaps 36A and 36B via the cavities 78 and 82, thereby reducing any likelihood of particle accumulation resulting in uncommanded lock-up of the MRF 10.

The drum portion 50 has a first surface 92 and a second surface 94 in contact with MRF 40 contained within the working gaps 36A and 36B, respectively. The first surface 92 and second surface 94 may have a roughness to reduce the surface sliding friction of the MRF 40, thereby increasing the shear forces that the MRF 40 imposes on the drum portion 50. The drum portion 50 of the present invention has a surface treatment on one or both of the first surface 92 and second surface 94. The surface treatment includes the deposition of a material on the first and/or second surfaces 92 and 94 with a wear resistance greater than that of the material forming the drum portion 50. In the preferred embodiment, the surface treatment will be electro-spark deposition, which is a pulsed arc micro-welding process. In this process, a layer of tungsten-carbide is deposited on the first surface 92 and second surface 94 with an average roughness, or Ra, value of between 10 and 250 microns and preferably in the range of 60 and 120 microns. A micron is generally understood to be one thousandth of a millimeter. By applying a surface treatment, having a high resistance to wear, to the first and/or second surface 92 and 94 of the drum portion 50, the surface roughness may be maintained throughout the service life of the MRC 10. Those skilled in the art will recognize that materials other than tungsten-carbide may be used while remaining within the scope of that which is claimed. Additionally, the surfaces forming the inner boundary 32 and the outer boundary 34 of the magnetically permeable ring member 28 and the magnetically permeable ring member 20, respectively, may include the surface treatment.

The first cover 24 and the hub portion 48 are rotatably supported on the output member 42 by sealed roller bearings 96 and 98, respectively. Labyrinth seals 100 and 102 have tight radial clearances and cooperate with the high viscosity of the MRF 40 to prevent the MRF 40 from reaching the roller bearings 96 and 98, respectively. By limiting the amount of MRF 40 that contacts the bearings 96 and 98, the likelihood of bearing failure due to MRF 40 incursion will decrease. FIG. 2a is a perspective view of the output member 42 illustrating the various aspects of the present invention.

In operation, the coil 64 is selectively and variably energized with electrical current, thereby creating the magnetic field 66 that passes through the MRF 40 contained within the working gap 36. When the MRF 40 is exposed to the magnetic field 66, the magnetic particles therein will align with the magnetic field 66 thereby increasing the viscosity of the MRF 40. The increase in viscosity necessarily increases the shear strength of the MRF 40 resulting in torque transfer from the input assembly 12 to the output member 42, causing rotation of the drive shaft 14, which operates the power steering pump 16. The torque transfer ability or characteristic of the MRF 40 varies with the intensity of the magnetic field 66.

Although the description has detailed the MRC 10 application within a power steering system, those skilled in the art will recognize that the present invention may be incorporated into other clutches employing MRF, such as fan clutches. Additionally, while the foregoing description describes an MRC 10 with a stationary coil 64, the invention herein described may be used in a rotating coil-type MRC. While the best modes for carrying out the invention have been described in detail, those familiar with the art to which this invention relates will recognize various alternative designs and embodiments for practicing the invention within the scope of the appended claims.

The invention claimed is:

1. A magneto-rheological coupling comprising:
an input assembly coaxially disposed and spaced from an output member such that at least one working gap is defined between said input assembly and said output member;
a magneto-rheological fluid at least partially disposed within said at least one working gap, said magneto-rheological fluid having a variable viscosity characteristic in the presence of a variable magnetic field;
wherein said output member has a generally cylindrical drum portion having a low magnetic permeability region, said low magnetic permeability region having a plurality of passages defined therein; and
wherein said passages allow said magneto-rheological fluid to pass therethrough wherein said output member has a hub portion extending generally radially from said drum portion, said hub portion defining a plurality of apertures extending to said magnetic drum portion, wherein said apertures allow said magneto-rheological fluid to pass therethrough.

2. A magneto-rheological coupling comprising:
an input assembly coaxially disposed and spaced from an output member such that at least one working gap is defined between said input assembly and said output member;
a magneto-rheological fluid at least partially disposed within said at least one working gap, said magneto-rheological fluid having a variable viscosity characteristic in the presence of a variable magnetic field;
wherein said output member has a generally cylindrical drum portion having a low magnetic permeability region, said low magnetic permeability region having a plurality of passages defined therein; and
wherein said passages allow said magneto-rheological fluid to pass therethrough wherein each of said plurality of passages is a circular hole.

3. A magneto-rheological coupling comprising:
an input assembly coaxially disposed and spaced from an output member such that at least one working gap is defined between said input assembly and said output member;
a magneto-rheological fluid at least partially disposed within said at least one working gap, said magneto-rheological fluid having a variable viscosity characteristic in the presence of a variable magnetic field;
wherein said output member has a generally cylindrical drum portion having a low magnetic permeability region, said low magnetic permeability region having a plurality of passages defined therein; and
wherein said passages allow said magneto-rheological fluid to pass therethrough wherein said generally cylindrical drum portion, formed from a material, is adapted to have at least one surface in contact with said magneto-rheological fluid, said at least one surface having a surface treatment thereon such that said at least one surface is harder than said material.

4. The magneto-rheological coupling of claim 3, wherein said surface treatment is the electro-spark deposition of tungsten-carbide.

5. The magneto-rheological coupling of claim 3, wherein said surface treatment has an average roughness, or Ra value, of between approximately 10 and 250 microns.

6. A magneto-rheological coupling comprising:
an input assembly coaxially disposed and spaced from an output member such that at least one working gap is defined between said input assembly and said output member;
a magneto-rheological fluid at least partially disposed within said at least one working gap, said magneto-rheological fluid having a variable viscosity characteristic in the presence of a variable magnetic field; and
wherein said output member has a generally cylindrical drum portion, wherein said generally cylindrical drum portion is formed from a material and is adapted to have at least one surface in contact with said magneto-rheological fluid, said at least one surface having a surface treatment thereon such that said at least one surface is harder than said material.

7. The magneto-rheological coupling of claim 6, wherein said surface treatment is the electro-spark deposition of tungsten-carbide.

8. The magneto-rheological coupling of claim 6, wherein said surface treatment has an average roughness, or Ra value, of between 10 and 250 microns.

9. The magneto-rheological coupling of claim 6, wherein said output member has a generally cylindrical drum portion having a low magnetic permeability region, said low magnetic permeability region having a plurality of passages defined therein and wherein said passages allow said magneto-rheological fluid to pass therethrough.

10. The magneto-rheological coupling of claim 6, wherein said output member has a hub portion extending generally radially from said drum portion, said hub portion defining a plurality of apertures extending to said magnetic drum portion, wherein said apertures allow said magneto-rheological fluid to pass therethrough.

11. A magneto-rheological coupling comprising:
an input assembly coaxially disposed and spaced from an output member such that at least one working gap is defined between said input assembly and said output member;
a magneto-rheological fluid at least partially disposed within said at least one working gap, said magneto-rheological fluid having a variable viscosity characteristic in the presence of a variable magnetic field;
wherein said output member has a generally cylindrical drum portion and wherein said generally cylindrical drum portion, formed from a material, is adapted to have at least one surface in contact with said magneto-rheological fluid; and
wherein said output member has a hub portion extending generally radially from said drum portion, said hub portion defining a plurality of apertures extending to said magnetic drum portion, wherein said apertures allow said magneto-rheological fluid to pass therethrough.

12. The magneto-rheological coupling of claim 11, wherein said generally cylindrical drum portion has a low magnetic permeability region, said low magnetic permeability region having a plurality of passages defined therein; and
wherein said passages allow said magneto-rheological fluid to pass therethrough.

13. The magneto-rheological coupling of claim 11, wherein said generally cylindrical drum portion is formed from a material, said at least one surface having a surface treatment thereon such that said at least one surface is harder than said material.

14. The magneto-rheological coupling of claim 13, wherein said surface treatment is the electro-spark deposition of tungsten-carbide.

15. The magneto-rheological coupling of claim 13, wherein said surface treatment has an average roughness, or Ra value, of between approximately 10 and 250 microns.

* * * * *